UNITED STATES PATENT OFFICE.

FREDERICK P. SIEBEL, OF CHICAGO, ILLINOIS, ASSIGNOR TO SIEBEL INSTITUTE OF TECHNOLOGY, OF CHICAGO, ILLINOIS, A CORPORATION OF ILLINOIS.

BREAD-MAKING PROCESS.

1,269,754.     Specification of Letters Patent.     Patented June 18, 1918.

No Drawing.     Application filed February 15, 1918. Serial No. 217,395.

*To all whom it may concern:*

Be it known that I, FREDERICK P. SIEBEL, a citizen of the United States, and a resident of Chicago, in the county of Cook and State of Illinois, have invented certain new and useful Improvements in Bread-Making Processes, of which the following is a specification.

My invention relates to the art of bread making and its object is to effect a saving of wheat flour and sugar. In general the invention consists in utilizing in the making of bread or similar food products material known as "brewers' grains" and wort which are products of the mashing processes.

It is well known that "brewers' grains" contain a very high percentage of protein and a somewhat smaller amount of soluble carbohydrates, such as maltose and dextrin, and also a small quantity of mineral salts, and their nutritive value is well established.

It is also well known that wort contains a notable amount of malt sugar (maltose) which can replace to an advantage the cane or beet sugar (sucrose) or corn sugar (dextrose) otherwise used for the making of bread, and for the propagation of yeast it contains besides this sugar proteins and phosphates in solution and therefore in a readily assimilable condition.

The "brewers' grains" are first ground to flour before addition to the dough and the wort is mixed with suitable yeast required for fermenting the dough, and by using these ingredients a considerable saving of wheat flour and sugar results together with a notable improvement in the quality of the respective baked products as to flavor and taste.

The baker can buy these ingredients or he can avail himself of the mashing process and produce them himself. If he produces them himself he will make a mash from water and crushed malt either alone or in conjunction with any gelatinized amylaceous material such as boiled rice, corn grits, corn flakes, or the like, observing, however, for the proper length of time particularly such temperature as is most conducive for obtaining in the resulting wort the maximum percentage of maltose.

After complete inversion of the starch the mash is allowed to settle, whereupon the clear wort is drained off, leaving the wet grains on the bottom of the tub in which the mashing was done. These grains are then removed, dried, and ground as finely as possible to form flour which is added to the other ingredients of the dough in such proportion as the baker finds convenient and practical, replacing thus a corresponding quantity of wheat flour.

The wort drained off from the grains is cooled and mixed with regular bakers' yeast or preferably a cultivated pure yeast and allowed to come into fermentation when it is ready to be mixed with the other ingredients for the dough, where it replaces the sugar and yeast otherwise employed. The yeast may be propagated, and for this purpose some of the fermenting wort is retained to be used for starting or mixing with the wort of subsequent brews, and so on.

The foregoing explains the principles and object of my invention, and I do not desire to be limited to the exact procedure described except as indicated in the following claims:

1. In the production of bread and similar baked food products, the steps of preparing a mash from water and malt, saccharifying this mash, separating the wort therefrom by draining off, cooling this wort to proper temperature, then mixing the same with yeast and after fermentation has set in adding the same to the dough in place of the sugar and yeast otherwise used in the manufacture of bread.

2. In the making of bread and similar baked food products, the steps of obtaining a wort from a malt mash, mixing the same with fermenting wort and after fermentation has started adding the same to the dough in place of the sugar and yeast usually employed in the dough.

3. In the making of bread and similar baked food products, the steps of obtaining a wort from a malt mash, adding yeast thereto, and after fermentation has set in adding a part of the same to the dough.

4. In the production of bread and similar food products, the steps of obtaining a wort from a malt mash, mixing the same with fermenting wort, and after it is in fermentation adding a part of the same to the dough and using the balance for propagating a subsequent wort.

5. In dough for bread and similar baked products, a flour made from "brewers' grains" in place of other flour, and a fermenting wort in place of ordinary sugar.

6. In dough for bread or other amylaceous baked products, a fermenting wort in place of ordinary sugar.

7. In dough for bread or other amylaceous baked products, a wort fermenting with cultivated pure yeast.

8. In the production of bread and similar food products, the steps of obtaining a wort from a malt mash, adding a fermenting agent to the wort and after it is in fermentation adding a part of the same to the dough and using the balance for propagating a subsequent wort.

9. In the making of bread and similar baked products, the steps of setting up fermentation in wort and adding it to the dough in place of the yeast and sugar usually employed.

10. In dough for bread and similar baked products, a liquid containing yeast which has been propagated therein as a substitute for the yeast usually used.

In witness whereof, I hereunto subscribe my name this 12th day of February, A. D. 1918.

FREDERICK P. SIEBEL.